(12) United States Patent
Yoshida et al.

(10) Patent No.: US 9,199,480 B2
(45) Date of Patent: Dec. 1, 2015

(54) OPTICAL SCANNING DEVICE AND IMAGE FORMING APPARATUS USING SAME

(71) Applicant: KYOCERA Document Solutions Inc., Osaka-shi, Osaka (JP)

(72) Inventors: Shingo Yoshida, Osaka (JP); Chika Sawamoto, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/496,143

(22) Filed: Sep. 25, 2014

(65) Prior Publication Data

US 2015/0092001 A1    Apr. 2, 2015

(30) Foreign Application Priority Data

Sep. 27, 2013    (JP) .................................. 2013-200882

(51) Int. Cl.
*B41J 2/45* (2006.01)
*B41J 2/455* (2006.01)
*G02B 26/12* (2006.01)
*G03G 15/043* (2006.01)

(52) U.S. Cl.
CPC *B41J 2/451* (2013.01); *B41J 2/455* (2013.01); *G02B 26/123* (2013.01); *G02B 26/125* (2013.01); *G02B 26/127* (2013.01); *G02B 26/129* (2013.01); *G03G 15/043* (2013.01); *G03G 15/0435* (2013.01)

(58) Field of Classification Search
CPC .............. B41J 2/45; B41J 2/455; B41J 2/473; B41J 19/145; B41J 19/147
See application file for complete search history.

(56) References Cited

U.S. PATENT DOCUMENTS

2005/0094235 A1* 5/2005 Mori ............................. 359/205
2008/0225102 A1* 9/2008 Tomita .......................... 347/129

FOREIGN PATENT DOCUMENTS

| JP | H11 109271 | 4/1999 |
| JP | H11 157128 | 6/1999 |
| JP | 2001-108924 | 4/2001 |

* cited by examiner

*Primary Examiner* — Kristal Feggins
*Assistant Examiner* — Kendrick Liu
(74) *Attorney, Agent, or Firm* — Gerald E. Hespos; Michael J. Porco; Matthew T. Hespos

(57) ABSTRACT

An optical scanning device includes first and second light sources, a polygon mirror, first and second scanning lenses, first and second reflecting mirrors, and an adjusting mechanism for adjusting the posture of the first reflecting mirror. The adjusting mechanism adjusts the posture of the first reflecting mirror using a predetermined first adjustment amount so that a first scanning line drawn by a first light beam to scan a first circumferential surface and a second scanning line drawn by a second light beam to scan a second circumferential surface are parallel when a drum rotation speed is a predetermined first speed, and adjusts the posture of the first reflecting mirror using a predetermined second adjustment amount different from the first adjustment amount and capable of making the first and second scanning lines parallel at a second speed different from the first speed when the drum rotation speed is the second speed.

4 Claims, 11 Drawing Sheets

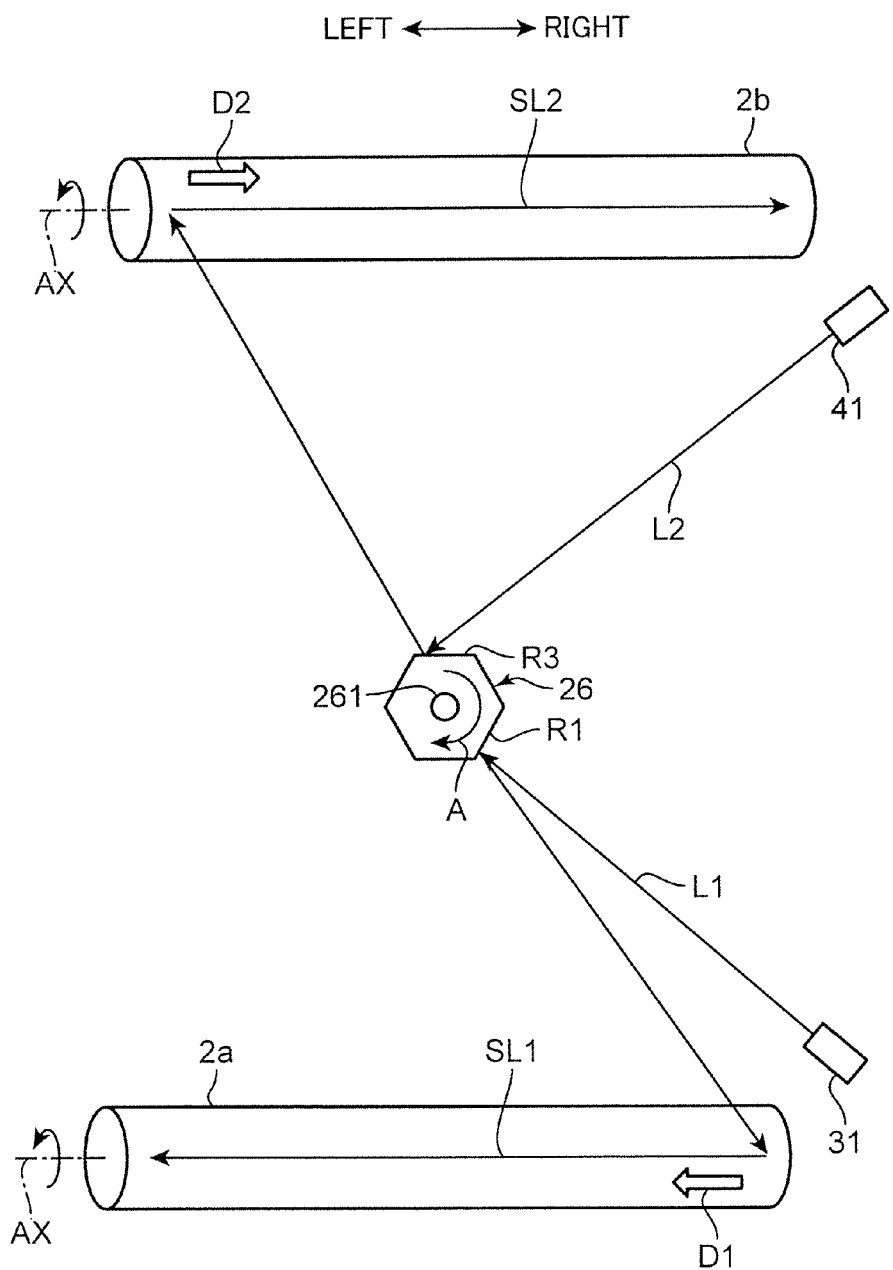

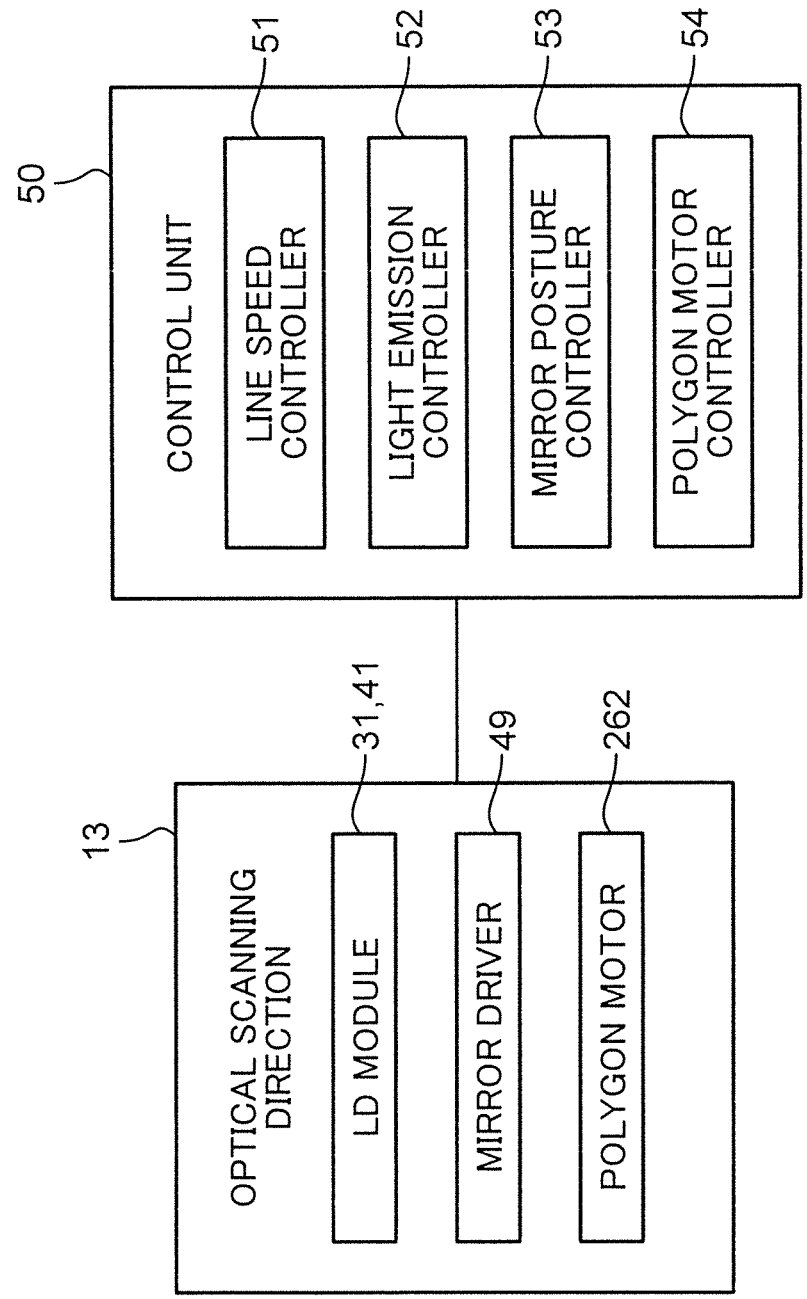

OPTICAL SCANNING DEVICE AND IMAGE FORMING APPARATUS USING SAME

INCORPORATION BY REFERENCE

This application is based on Japanese Patent Application No. 2013-200882 filed with the Japan Patent Office on Sep. 27, 2013, the contents of which are hereby incorporated by reference.

BACKGROUND

The present disclosure relates to an optical scanning device including scanning lenses for imaging light beams on surfaces to be scanned and an image forming apparatus using this.

For example, a general optical scanning device used in a laser printer, a copier or the like includes a light source for emitting a laser light beam, a polygon mirror for deflecting the laser light beam to scan the surface to be scanned with the laser light beam and a scanning lens for imaging the deflected laser light beam on a circumferential surface (surface to be scanned) of a photoconductive drum. In a color printer, photoconductive drums are provided for four colors of cyan (C), magenta (M), yellow (Y) and black (Bk) and each circumferential surface is scanned with a laser light beam modulated by image data of each color.

The optical scanning device is in a mode to be individually arranged for the photoconductive drum of each color or in a mode to be arranged for two colors or four colors by sharing a housing, a light source unit and optical components as widely used particularly in small-size printers. In the mode in which one optical scanning device is used for a plurality of colors, a polygon mirror is shared. In a two-color sharing type, two laser light beams are caused to be incident on the polygon mirror in different directions and the respective laser light beams are deflected by different mirror surfaces and imaged on the circumferential surfaces of corresponding photoconductive drums. In this mode, scanning directions of the laser light beams on one and the other drum circumferential surfaces are opposite (hereinafter, this mode is called an "opposite scanning method" in this specification).

Since the photoconductive drum rotates about an axis during one line scanning in a main scanning direction, a scanning line is inclined in a sub scanning direction. In the opposite scanning method, the inclination of the scanning line on one drum circumferential surface is opposite to that on the other drum circumferential surface. This causes a color shift in the sub scanning direction.

SUMMARY

An optical scanning device according to one aspect of the present disclosure scans a first circumferential surface as a surface to be scanned of a first photoconductive drum rotatable about an axis and a second circumferential surface as a surface to be scanned of a second photoconductive drum rotatable about an axis with light beams. The optical scanning device includes a first light source for emitting a light beam, a second light source for emitting a light beam, a polygon mirror, a first scanning lens and a second scanning lens, a first reflecting mirror and a second reflecting mirror, and an adjusting mechanism.

The polygon mirror includes a plurality of mirror surfaces and scans the first circumferential surface in a first direction along a main scanning direction by deflecting a first light beam emitted from the first light source and, on the other hand, scans the second circumferential surface in a second direction opposite to the first direction by deflecting a second light beam emitted from the second light source while rotating about an axis. The first scanning lens images the first light beam on the first circumferential surface and the second scanning lens images the second light beam on the second circumferential surface. The first reflecting mirror for reflecting the first light beam so that the first light beam propagates toward the first circumferential surface, the first reflecting mirror being arranged on optical path between the polygon mirror and the first circumferential surface, and a second reflecting mirror for reflecting the second light beam so that the second light beam propagates toward the second circumferential surface, the second reflecting mirror being arranged on optical path between the polygon mirror and the second circumferential surface. The adjusting mechanism adjusts the posture of at least the first reflecting mirror.

The adjusting mechanism adjusts the posture of the first reflecting mirror using a predetermined first adjustment amount so that a first scanning line drawn by the first light beam to scan the first circumferential surface and a second scanning line drawn by the second light beam to scan the second circumferential surface are parallel when a rotation speed of the first and second photoconductive drums is a predetermined first speed. Further, the adjusting mechanism adjusts the posture of the first reflecting mirror using a predetermined second adjustment amount different from the first adjustment amount and capable of making the first and second scanning lines parallel at a second speed different from the first speed when the rotation speed of the first and second photoconductive drums is the second speed.

An image forming apparatus according to another aspect of the present disclosure includes a first photoconductive drum having a first circumferential surface as a surface to be scanned and rotatable about an axis, a second photoconductive drum having a second circumferential surface as a surface to be scanned and rotatable about an axis, and the above optical scanning device for radiating light beams to the first and second circumferential surfaces.

These and other objects, features and advantages of the present disclosure will become more apparent upon reading the following detailed description along with the accompanying drawings.

BRIEF DESCRIPTION OF THE DRAWINGS

FIG. 6 is a diagram showing the scanning of drum circumferential surfaces by an opposite scanning method, FIG. 8 is a block diagram showing a control configuration of the optical scanning device.

DETAILED DESCRIPTION

Figure 1:
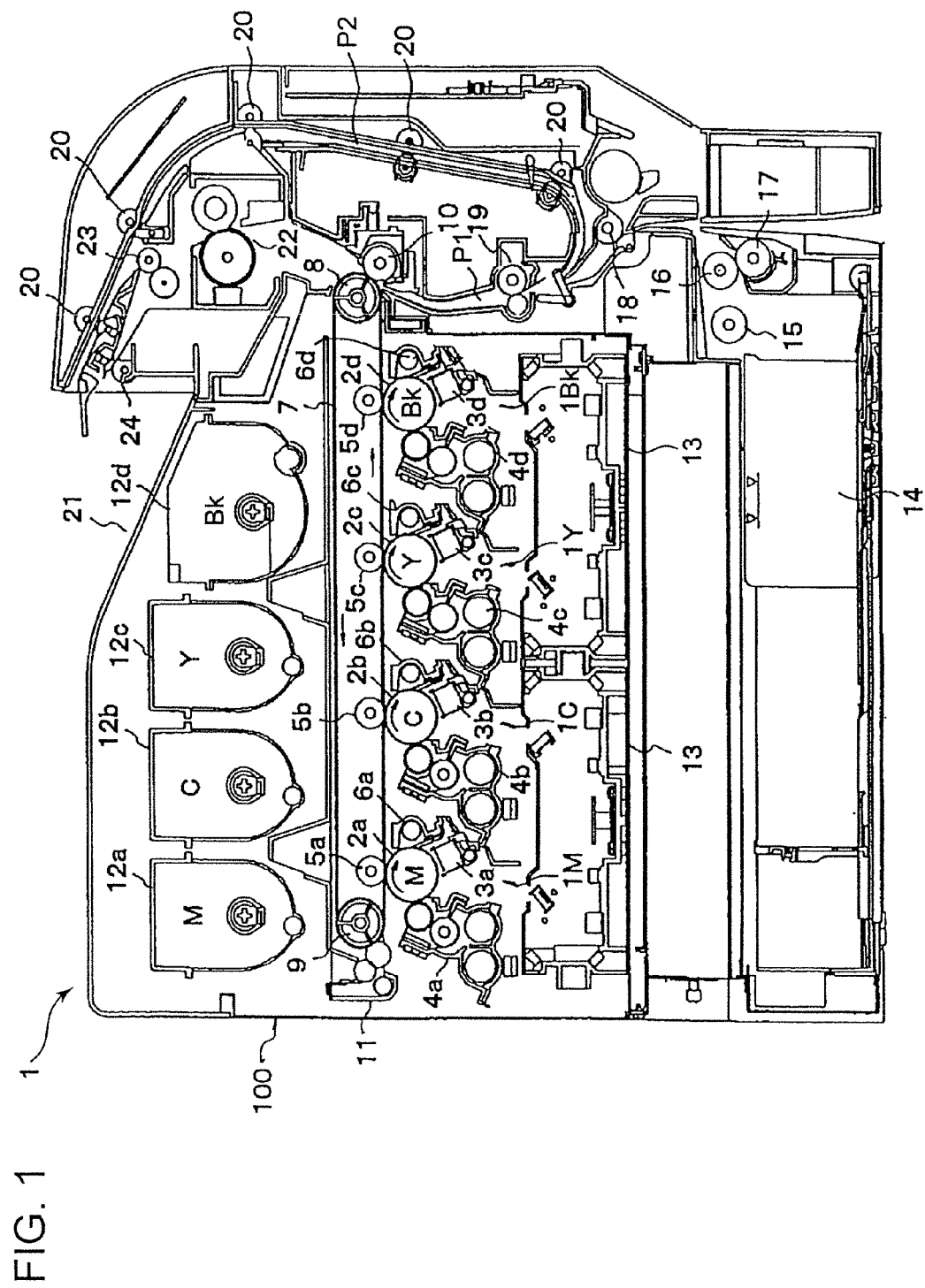
FIG. 1 is a sectional view showing a schematic configuration of an image forming apparatus according to one embodiment of the present disclosure.

Hereinafter, an optical scanning device according to one embodiment of the present disclosure is described based on the drawings. FIG. 1 is a sectional view of a full-color printer 1 according to one embodiment of an image forming apparatus of the present disclosure. The printer 1 is of a tandem type and a magenta image forming unit 1M, a cyan image forming unit 1C, a yellow image forming unit 1Y and a black image forming unit 1Bk are tandemly arranged at specified intervals in a central part of the interior of a main body 100 of the printer 1.

The image forming units 1M, 1C, 1Y and 1Bk respectively include photoconductive drums 2a, 2b, 2c and 2d. A charger 3a, 3b, 3c, 3d, a developing device 4a, 4b, 4c, 4d, a transfer roller 5a, 5b, 5c, 5d and a drum cleaning device 6a, 6b, 6c, 6d are respectively arranged around each photoconductive drum 2a to 2d. An intermediate transfer belt 7 and toner containers 12a, 12b, 12c and 12d are arranged above the image forming units 1M, 1C, 1Y and 1Bk and optical scanning devices 13 are arranged therebelow.

The photoconductive drum 2a to 2d includes a rotary shaft extending in a direction perpendicular to the plane of FIG. 1 and a cylindrical circumferential surface for bearing an electrostatic latent image and a toner image. The photoconductive drum 2a to 2d is driven and rotated about an axis in an arrow direction (clockwise direction) at a rotation speed corresponding to a predetermined process line speed by an unillustrated drive motor. The charger 3a to 3d charges the circumferential surface of the photoconductive drum 2a to 2d by a charging bias applied from an unillustrated charging bias power supply.

The optical scanning devices 13 irradiate laser light beams to the uniformly charged circumferential surfaces (surfaces to be scanned) of the photoconductive drums 2a to 2d to form electrostatic latent images corresponding to color image signals of the respective colors on the respective photoconductive drums 2a to 2d. An example in which two optical scanning devices 13 of a two-color sharing type for magenta and cyan and for yellow and black are juxtaposed is shown in this embodiment. Although described in detail later, the optical scanning devices 13 are optical scanning devices of an opposite scanning method.

The developing devices 4a to 4d respectively supply magenta (M) toner, cyan (C) toner, yellow (Y) toner and black (Bk) toner to the circumferential surfaces of the respective photoconductive drums 2a to 2d. By this supply, the toner of each color adheres to each electrostatic latent image formed on the circumferential surface of each photoconductive drum 2a to 2d and each electrostatic latent image is visualized as a toner image of each color. The toner container 12a to 12d supplies the toner of the corresponding color to each developing device 4a to 4d. The transfer roller 5a to 5d is pressed into contact with the corresponding photoconductive drum 2a to 2d via the intermediate transfer belt 7 to form a primary transfer portion. The drum cleaning device 6a to 6d cleans the circumferential surface of each photoconductive drum 2a to 2d after primary transfer.

The intermediate transfer belt 7 has an outer peripheral surface to which a toner image carried on the circumferential surface of each photoconductive drum 2a to 2d is primarily transferred. The intermediate transfer belt 7 is stretched between a drive roller 8 and a tension roller 9 and travels in a circulating manner by driving the drive roller 8. A secondary transfer roller 10 is pressed into contact with the drive roller 8 via the intermediate transfer belt 7 to form a secondary transfer portion. A belt cleaning device 11 is arranged near the tension roller 9.

The printer 1 further includes a sheet cassette 14 detachably attached near a bottom part of the main body 100 and a conveyance path P1 and a reversing conveyance path P2 arranged near a right side part of the main body 100. A plurality of sheets to which an image forming process is to be applied are stored in the sheet cassette 14. A pickup roller 15 for picking up sheets from the sheet cassette 14 and a feed roller 16 and a retard roller 17 for feeding the picked-up sheets one by one to the conveyance path P1 while separating them are arranged near the sheet cassette 14.

The conveyance path P1 is a vertically extending conveyance path and a pair of conveyor rollers 18 and a pair of registration rollers 19 for conveying the sheets are provided in a conveyance route of the conveyance path P1. The pair of registration rollers 19 feed a sheet to the secondary transfer portion at a predetermined timing after causing the sheet to temporarily wait. The reversing conveyance path P2 is a conveyance path used in the case of forming images on both sides of a sheet. A plurality of pairs of reversing rollers 20 are provided at suitable intervals in the reversing conveyance path P2.

The conveyance path P1 extends up to a sheet discharge tray 21 provided on the upper surface of the main body 100, and a fixing device 22 and pairs of discharge rollers 23, 24 are provided at intermediate positions of the conveyance path P1. The fixing device 22 includes a fixing roller and a pressure roller and performs a fixing process for fixing a toner image to a sheet by heating and pressing the sheet passing through a nip portion between the fixing roller and the pressure roller. The pairs of discharge rollers 23, 24 discharge the sheet after the fixing process to the sheet discharge tray 21.

Next, an image forming operation by the printer 1 configured as described above is outlined. When an instruction signal for image formation is given, the photoconductive drums 2a to 2d are driven in the respective image forming units 1M, 1C, 1Y and 1Bk. The surfaces of these photoconductive drums 2a to 2d are uniformly charged by the chargers 3a to 3d. The respective optical scanning devices 13 emit laser light beams modulated by color image signals of the corresponding colors and scan the circumferential surfaces of the corresponding photoconductive drums 2a to 2d to form electrostatic latent images.

First, the magenta toner is supplied from the developing device 4a to the photoconductive drum 2a of the magenta image forming unit 1M and the electrostatic latent image on the photoconductive drum 2a is developed as a magenta toner image. This magenta toner image is primarily transferred onto the intermediate transfer belt 7 by the action of the transfer roller 5a, to which a primary transfer bias having a polarity opposite to that of the toner is applied, in the primary transfer portion between the photoconductive drum 2a and the transfer roller 5a.

A similar developing operation is successively performed in the cyan, yellow and black image forming units 1C, 1Y and 1Bk. A cyan image, a yellow image and a black image formed on the respective photoconductive drums 2b, 2c and 2d are successively transferred onto the magenta toner image on the intermediate transfer belt 7 in a superimposed manner. In this way, a full-color toner image is formed on the intermediate transfer belt 7. Note that transfer residual toner remaining on the respective photoconductive drums 2a to 2d without being transferred to the intermediate transfer belt 7 is removed by the respective drum cleaning devices 6a to 6d.

In synchronization with a timing at which the full-color toner image on the intermediate transfer belt 7 reaches the secondary transfer portion between the drive roller 8 and the secondary transfer roller 10, a sheet fed to the conveyance path P1 from the sheet cassette 14 is conveyed to the secondary transfer portion by the pair of registration rollers 19. The toner images of all the colors are collectively secondarily transferred from the intermediate transfer belt 7 to the sheet by the secondary transfer roller 10 to which a secondary transfer bias having a polarity opposite to that of the toner is applied.

Thereafter, the sheet is conveyed to the fixing device 22 and passed through the fixing nip portion. The full-color toner image is thermally fixed to a surface of the sheet by being heated and pressed at this time. The sheet having the toner image fixed thereto is discharged onto the sheet discharge tray 21 by the pairs of discharge rollers 23, 24, whereby a series of image forming operations are completed. Note that the transfer residual toner remaining on the intermediate transfer belt 7 without being transferred to the sheet is removed by the belt cleaning device 11.

Figure 2:
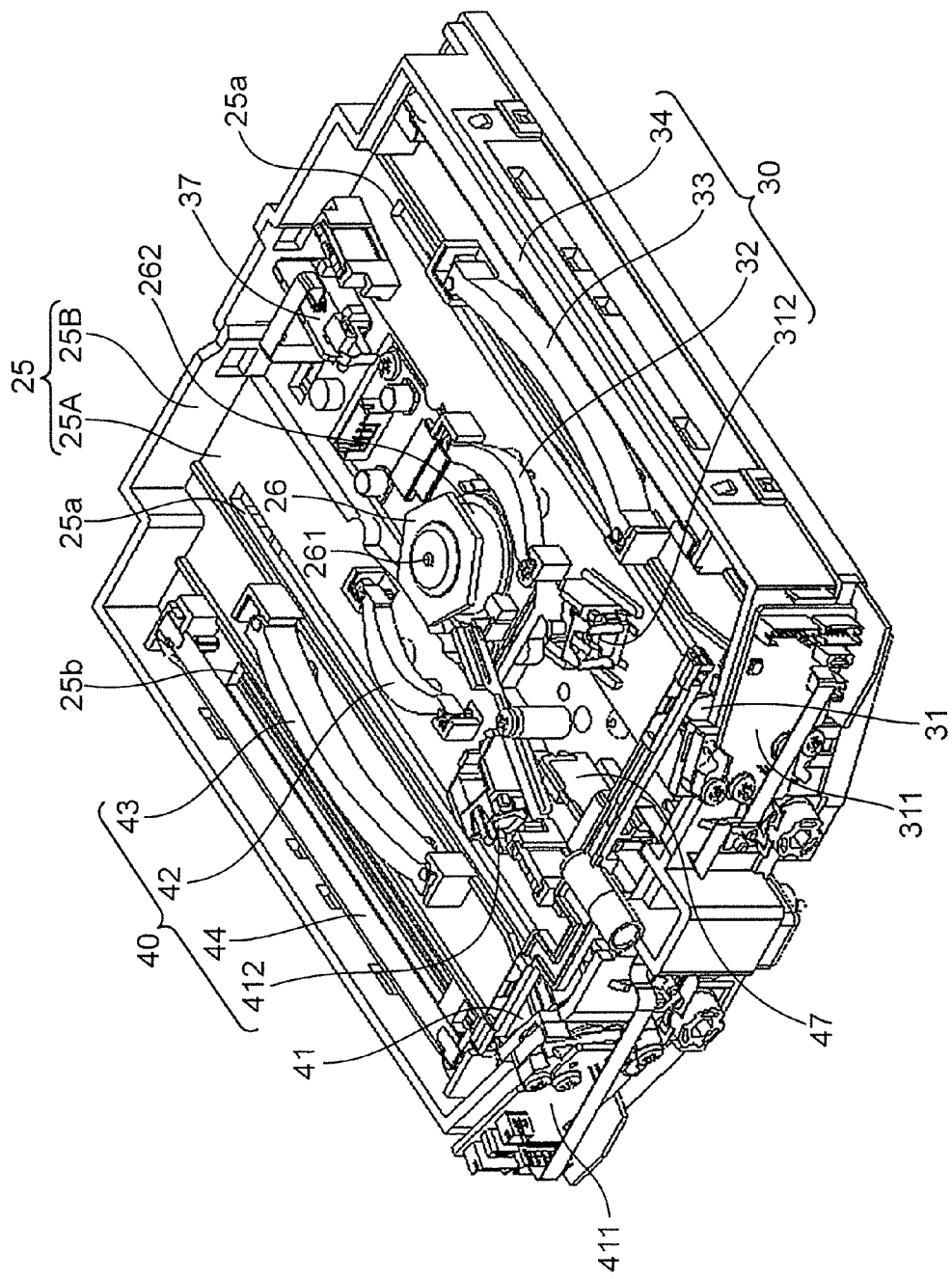
FIG. 2 is a perspective view showing the internal structure of an optical scanning device.
Figure 3:
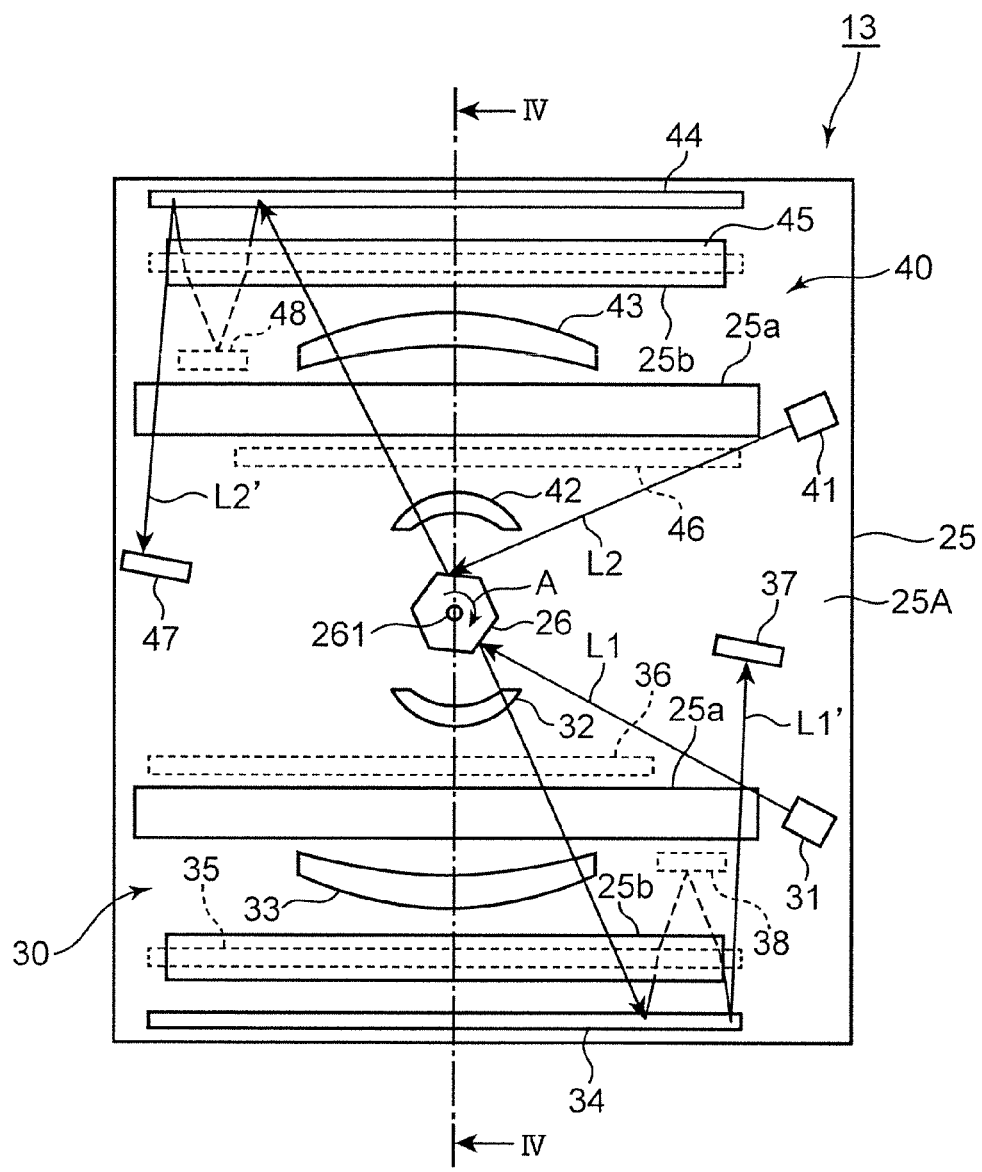
FIG. 3 is a plain view schematically showing the internal structure of the optical scanning device.
Figure 4:
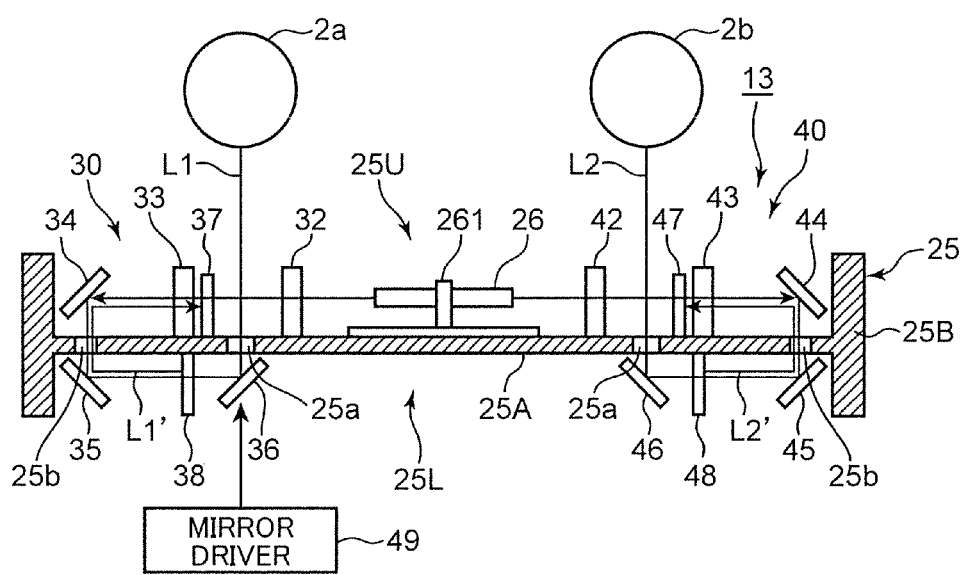
FIG. 4 is a sectional view along line IV-IV of FIG. 3, FIGS. 5A, 5B and 5C are perspective views showing examples of an LD module.

Next, the detailed structure of the optical scanning devices 13 is described. Note that since the two optical scanning devices 13 provided in the printer 1 shown in FIG. 1 have the same basic configuration, only one optical scanning device 13 is shown and described below. FIG. 2 is a perspective view showing the internal structure of the optical scanning device 13, FIG. 3 is a plan view schematically showing the internal structure of the optical scanning device 13 and FIG. 4 is a sectional view along line IV-IV of FIG. 3. Note that one optical scanning device 13 shown here is for exposure-scanning the photoconductive drum 2a of the magenta image forming unit 1M and the photoconductive drum 2b of the cyan image forming unit 1C shown in FIG. 1.

The optical scanning device 13 includes a housing 25 integrally molded of resin. As shown in FIG. 4, the housing 25 includes a base board 25A formed of a horizontal flat plate member for partitioning the internal space of the housing 25 into an upper space 25U and a lower space 25L, and a frame-like side wall 25B surrounding the base board 25A. A structure composed of the base board 25A and the side wall 25B is H-shaped in a side cross-section. Note that, although not shown, a lid member for closing an opening of the upper space 25U and a bottom plate member for closing an opening of the lower space 25L are respectively mounted on the housing 25.

A polygon mirror 26 is arranged in a central part of the upper space 25U of the housing 25. A first scanning optical system 30 and a second scanning optical system 40 are symmetrically arranged at opposite sides of the polygon mirror 26 in the upper and lower spaces 25U, 25L of the housing 25. The first scanning optical system 30 is an optical system for scanning the circumferential surface (first circumferential surface) of the magenta photoconductive drum 2a (first photoconductive drum), and the second scanning optical system 40 is an optical system for scanning the circumferential surface (second circumferential surface) of the cyan photoconductive drum 2a (second photoconductive drum). That is, the optical scanning device 13 of this embodiment is a device of an opposite scanning method in which one polygon mirror 26 is shared by two scanning optical systems 30, 40 arranged to face each other.

The polygon mirror 26 has a plurality of mirror surfaces (six mirror surfaces in this embodiment) for deflecting (reflecting) a laser light beam. A rotary shaft 261 is mounted at the center of gravity of the polygon mirror 26. A polygon motor 262 is coupled to this rotary shaft 261. The polygon mirror 26 rotates about an axis of the rotary shaft 261 by driving the polygon motor 262.

The first and second scanning optical systems 30, 40 respectively include a first LD (Laser Diode) module 31 (first light source) and a second LD module 41 (second light source) for emitting first and second laser light beams L1, L2 (first and second light beams) of a specified wavelength. The first and second LD modules 31, 41 include laser diodes and are arranged in the upper space 25U while being mounted on printed circuit boards 311, 411 assembled with the side wall 25B of the housing 25. Optical components of the first and second scanning optical systems 30, 40 are respectively arranged on optical paths of the first and second laser light beams L1, L2 from the first and second LD modules 31, 41 to the circumferential surfaces of the magenta and cyan photoconductive drums 2a, 2b.

Figure 5A:
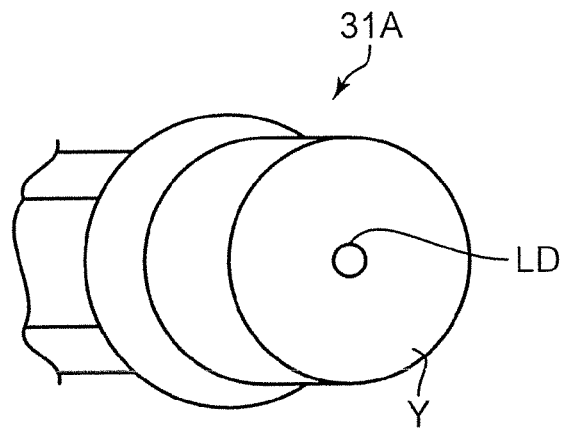
Figure 5B:
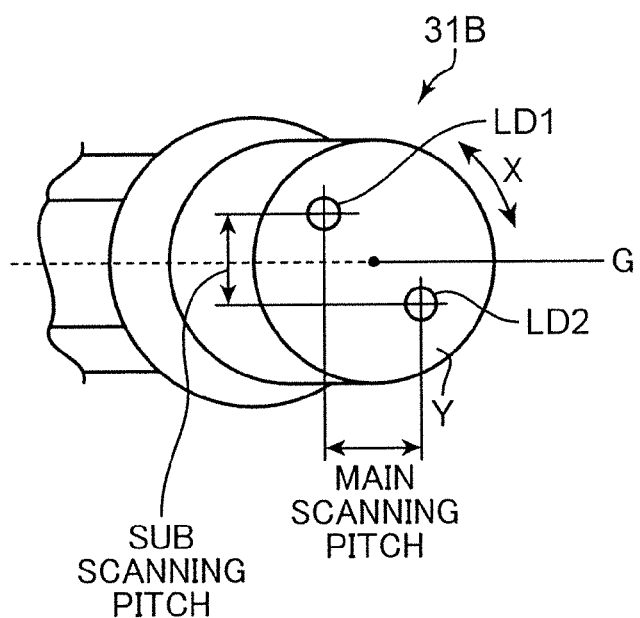
Figure 5C:
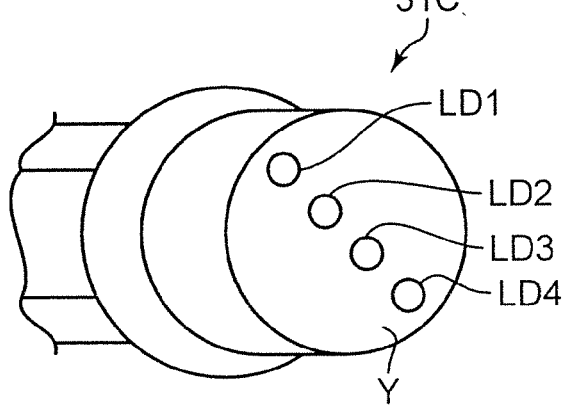

FIGS. 5A to 5C are perspective views showing examples of an LD module. FIG. 5A shows an LD module 31A of a single beam type. The LD module 31A includes one laser diode LD on a tip surface Y (emission surface) of a tubular holder and emits one laser light beam.

FIG. 5B shows an LD module 31B of a multi-beam type which includes two laser diodes LD1, LD2 on a tip surface Y and emits two laser light beams. Here, a monolithic laser diode including two light emitters is, for example, used. If this LD module 31B is used, two scanning lines can be simultaneously drawn by one scanning. Further, by rotating the LD module 31B in directions of arrows X with a normal G passing through a center out of normals to the tip surface Y as an axis of rotation, a sub scanning pitch (resolution) of two laser light beams can be adjusted.

FIG. 5C shows an LD module 31C of a multi-beam type which includes four laser diodes LD1, LD2, LD3 and LD4 on a tip surface Y and emits four laser light beams. If this LD module 31C is used, four scanning lines can be simultaneously drawn by one scanning.

The first scanning optical system 30 includes an incident optical unit 312, a first imaging lens 32 (one of first scanning lenses), a second imaging lens 33 (one of the first scanning lenses), a first reflection mirror 34, a second reflection mirror 35 and a third reflection mirror 36 (first reflecting mirror). The second scanning optical system 40 includes an incident optical unit 412, a first imaging lens 42 (one of second scanning lenses), a second imaging lens 43 (one of the second scanning lenses), a first reflection mirror 44, a second reflection mirror 45 and a third reflection mirror 46 (second reflecting mirror). The first imaging lenses 32, 42, the second imaging lenses 33, 43 and the first reflection mirrors 34, 44 are arranged in the upper space 25U of the housing (on the upper surface of the base board 25A) and the second reflection mirrors 35, 45 and the third reflection mirrors 36, 46 are arranged in the lower space 25L (on the lower surface of the base board 25A).

Each of the incident optical units 312, 412 includes a collimator lens and a cylindrical lens. The respective collimator lenses convert the first and second laser light beams L1, L2 emitted from the first and second LD modules 31, 41 and diffused into parallel light. The respective cylindrical lenses convert the first and second laser light beams L1, L2 emerging from the respective collimator lenses into linear light long in a main scanning direction and image them on the mirror surfaces of the polygon mirror 26. The first laser light beam L1 emerging from the first LD module 31 is incident on one mirror surface of the polygon mirror 26 and the second laser light beam L2 emerging from the second LD module 41 is incident on another mirror surface different from the one mirror surface of the polygon mirror 26, whereby the both light beams are deflected in two symmetric directions.

The first and second imaging lenses 32, 33 of the first scanning optical system 30 are lenses having an fθ characteristic. The first and second imaging lenses 32, 33 convert the first laser light beam L1 deflected by the one mirror surface of the polygon mirror 26 into constant-speed light and image the constant-speed light on the circumferential surface of the photoconductive drum 2a. The first and second imaging lenses 42, 43 of the second scanning optical system 40 are likewise lenses having an fθ characteristic and convert the second laser light beam L2 deflected by the other mirror surface of the polygon mirror 26 into constant-speed light and image the constant-speed light on the circumferential surface of the photoconductive drum 2b.

With reference to FIG. 4, the first reflection mirrors 34, 44, the second reflection mirrors 35, 45 and the third reflection mirrors 36, 46 are respectively mirrors arranged on the optical paths between the polygon mirror 26 and the circumferential surfaces of the photoconductive drums 2a, 2b and configured to reflect the first and second laser light beams (scanning light) L1, L2 toward the circumferential surfaces of the photoconductive drums 2a, 2b.

The first reflection mirror 34 of the first scanning optical system 30 is a mirror which reflects the first laser light beam L1 at 90° so that the first laser light beam L1 horizontally propagating in the upper space 25U propagates toward the lower space 25L. The second reflection mirror 35 is a mirror on which the first laser light beam L1 reflected by the first reflection mirror 34 is incident and which further reflects the first laser light beam L1 at 90° so that the first laser light beam L1 horizontally propagates in the lower space 25L. The third reflection mirror 36 is a mirror on which the first laser light beam L1 reflected by the second reflection mirror 35 is incident and which further reflects the first laser light beam L1 at 90° so that the first laser light beam L1 propagates toward the circumferential surface of the photoconductive drum 2a through the upper space 25U.

In this embodiment, a mirror driver 49 (adjusting mechanism) for adjusting the posture of this third reflection mirror 36 is additionally provided. The mirror driver 49 changes a reflecting direction of the first laser light beam L1 such as by rotating the third reflection mirror 36 in a pitch, yaw or roll direction, for example, to change the inclination of the third reflection mirror 36, distorting the third reflection mirror 36 such as by twisting or curving it or displacing the third reflection mirror 36 by combining the former two techniques. Specifically, the mirror driver 49 changes the posture of the reflection mirror 36, thereby changing an imaging position of the first laser light beam L1 on the circumferential surface of the photoconductive drum 2a. Note that it is also possible to adjust the posture of the first or second reflection mirror 34 or 35 instead of the third reflection mirror 36. However, it is preferable to adjust the posture of the third reflection mirror 36 closest to an imaging surface since the imaging position can be accurately adjusted.

The first, second and third reflection mirrors 44, 45 and 46 of the second scanning optical system 40 are similar to those of the first scanning optical system 30 and cause the second laser light beam L2 to propagate toward the circumferential surface of the photoconductive drum 2b by respectively reflecting the second laser light beam L2 at 90°. Although the postures of the mirrors 44, 45, 46 of the second scanning optical system 40 are not adjusted, these may be also adjusted in another embodiment.

To allow the first and second laser light beams L1, L2 to be reflected through the base board 25A as described above, the base board 25A is formed with first openings 25a and second openings 25b for allowing the passage of the first and second laser light beams L1, L2. The first openings 25a are rectangular openings long in the main scanning direction (lateral direction of FIG. 3) and arranged at positions of the base board 25A on optical paths connecting the third reflection mirrors 36, 46 and the photoconductive drums 2a, 2b and between the first imaging lenses 32, 42 and the second imaging lenses 33, 43. The second openings 25b are rectangular openings long in the main scanning direction and arranged on optical paths connecting the first reflection mirrors 34, 44 and the second reflection mirrors 35, 45.

The optical scanning device 13 further includes a first synchronization detector 37 arranged for the first scanning optical system 30 and a second synchronization detector 47 arranged for the second scanning optical system 40. The first and second synchronization detectors 37, 47 are arranged at positions lateral to the first imaging lenses 32, 42 on the upper surface of the base board 25A (in the upper space 25U) and point-symmetrical with respect to the polygon mirror 26. These synchronization detectors 37, 47 are respectively arranged outside effective scanning ranges of the respective photoconductive drums 2a, 2b by the first and second laser light beams L1, L2. Scanning (writing) start timings on the photoconductive drums 2a, 2b by the first and second laser light beams L1, L2 are determined by the first and second synchronization detectors 37, 47 respectively detecting light beams L1', L2' for synchronization detection.

The first and second scanning optical systems 30, 40 include synchronization detection mirrors 38, 48 for reflecting the light beams L1', L2' for synchronization detection and respectively introducing them to the first and second synchronization detectors 37, 47. The synchronization detection mirrors 38, 48 are respectively arranged on the lower surface of the base board 25A (in the lower space 25L) and outside the effective scanning ranges. Note that longitudinal end areas of the aforementioned first reflection mirrors 34, 44 and second reflection mirrors 35, 45 are present at intermediate positions of optical paths for synchronization detection from the polygon mirror 26 to the first and second synchronization detection mirrors 38, 48.

Next, the function of the optical scanning device 13 configured as described above is described further with reference to FIG. 6. The first laser light beam L1 emerging from the first LD module 31 is incident on a first mirror surface R1 of the polygon mirror 26 driven and rotated about the axis of the rotary shaft 261 in a direction of an arrow A at a predetermined speed after being condensed into a linear light beam by the incident optical unit 312. On the other hand, the second laser light beam L2 emerging from the second LD module 41 is incident on a third mirror surface R3 of the polygon mirror 26 after being condensed into a linear light beam by the incident optical unit 412. The third mirror surface R3 is a surface whose plane direction is different by 120° from that of the first mirror surface R1 about the axis of the rotary shaft 261.

The first and second laser light beams L1, L2 are deflected (reflected) in two directions symmetrical with respect to the polygon mirror 26. The first laser light beam L1 is imaged on the circumferential surface of the magenta photoconductive drum 2a near the right end and the second laser light beam L2 is imaged on the circumferential surface of the cyan photoconductive drum 2b near the left end. Before being imaged, the first and second laser light beams L1, L2 are first converted into constant speed light by passing through the first imaging lenses 32, 42 and the second imaging lenses 33, 34 as shown in FIG. 4. Thereafter, the first and second laser light beams L1, L2 are reflected downward at a right angle by the first reflection mirrors 34, 44, pass through the second openings 25b and reach the second reflection mirrors 35, 45. Subsequently, the first and second laser light beams L1, L2 are reflected at a right angle by the second reflection mirrors 35, 45 and horizontally propagate along the lower surface of the base board 25A. Thereafter, the first and second laser light beams L1, L2 are reflected upward at a right angle by the third reflection mirrors 36, 46, pass through the first openings 25a and propagate toward the photoconductive drums 2a, 2b.

The first laser light beam L1 scans the circumferential surface of the magenta photoconductive drum 2a rotating about an axis of rotation AX in a first direction D1 from the right end as a writing start position toward the left end along the main scanning direction, thereby drawing (exposing) a scanning line SL1. On the other hand, the second laser light beam L2 scans the circumferential surface of the cyan photoconductive drum 2b rotating about an axis of rotation AX in a second direction D2 from the left end as a writing start position toward the right end along the main scanning direction, thereby drawing a scanning line SL2. That is, the first and second laser light beams L1, L2 draw the scanning lines SL1, SL2 in mutually opposite directions (opposite scanning method).

Figure 7A:
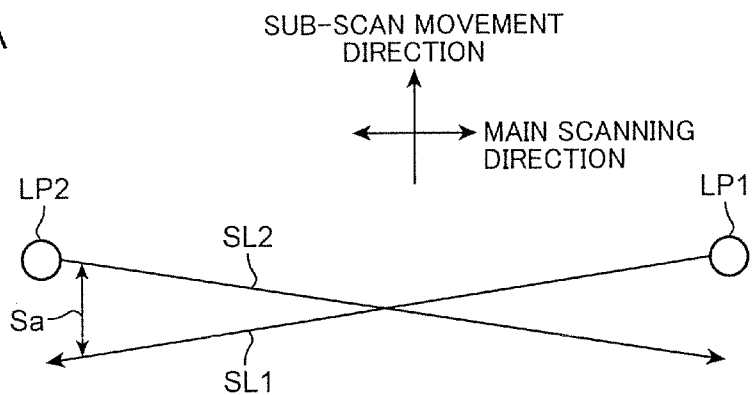
FIGS. 7A, 7B and 7C are diagrams for explaining gradients of scanning lines.
Figure 7B:
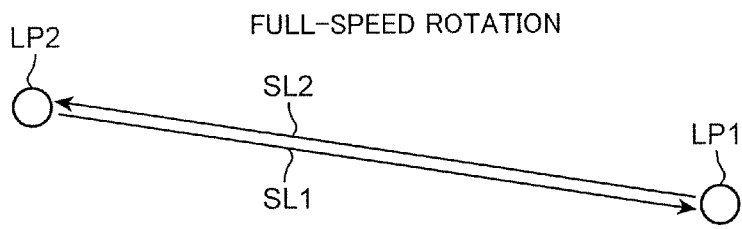
Figure 7C:
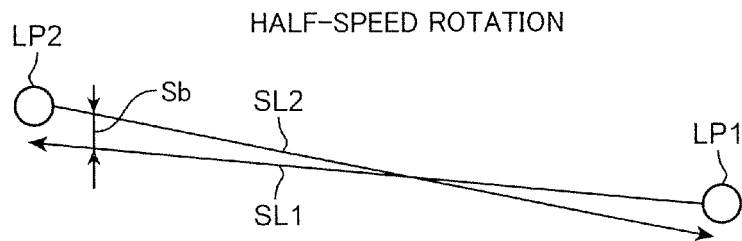

FIGS. 7A to 7C are diagrams showing gradients of the scanning lines SL1, SL2. Since the photoconductive drums 2a, 2b are rotating about the axis of rotation AX during scanning, the scanning lines SL1, SL2 are not horizontal and rather inclined in the sub scanning direction according to the rotation speed of the photoconductive drums 2a, 2b. As shown in FIG. 7A, a beam spot LP1 of the first laser light beam L1 whose writing start position is located at the right end draws the scanning line SL1 inclined downwardly to the left. On the other hand, a beam spot LP2 of the second laser light beam L2 whose writing start position is located at the left end draws the scanning line SL2 inclined downwardly to the right. Thus, the scanning lines SL1, SL2 are not parallel and a line gap Sa is created at line end parts. Such a line gap Sa causes a color shift of cyan and magenta.

To prevent this color shift, the scanning line SL1 is, for example, skewed so as to be parallel to the scanning line SL2. The inventors of this application first considered to adjust the skew in accordance with a full-speed mode in which the photoconductive drums 2a, 2b are rotated at a full speed (drum rotation speed when the printer 1 performs an image forming process at a normal process line speed). Specifically, the third reflection mirror 36 of the first scanning optical system 30 (or the third reflection mirror 46 of the second scanning optical system 40) was mounted in the housing 25 after the posture thereof was adjusted to eliminate the line gap Sa. This enabled the beam spots LP1, LP2 to have the same scanning path, i.e. the scanning lines SL1, SL2 to be parallel to each other as shown in FIG. 7B.

However, if the rotation speed of the photoconductive drums 2a, 2b changes, the amount of movement of the drum circumferential surfaces in the sub scanning direction per unit time changes from that in the full-speed mode. Thus, the parallelism of the both scanning lines cannot be maintained. The printer 1 may perform the image forming process in a low-speed mode in which the rotation speed of the photoconductive drums 2a, 2b is reduced as compared with that in the full-speed mode such as in the case of forming an image on a thick sheet or forming a high definition image. Normally, if m denotes the rotation speed (first speed) of the photoconductive drums 2a, 2b in the full-speed mode, a rotation speed (second speed) in the low-speed mode is m×1/n (where n is an integer not smaller than 2). Preferably, n=2 or 4. That is, in the low-speed mode, the photoconductive drums 2a, 2b are driven and rotated at 1/n, preferably ½ or ¼, of the drum rotation speed in the full-speed mode. For example, in the case of rotation at a half speed, a line gap Sb corresponding to a speed difference between the full speed and the half speed is created between the scanning lines SL1, SL2 drawn by the beam spots LP1, LP2 as shown in FIG. 7C. This line gap Sb also causes a color shift between cyan and magenta.

In view of this problem, the printer 1 (optical scanning device 13) of this embodiment has a function of eliminating not only the line gap Sa in the full-speed mode, but also the line gap Sb in the low-speed mode. FIG. 8 is a block diagram showing a control configuration of the optical scanning device 13. The printer 1 includes a control unit 50 having the above function of eliminating the line gaps. The control unit 50 is a microcomputer which is operated by a control program and functionally includes a line speed controller 51, a light emission controller 52 (light source controller), a mirror posture controller 53 (part of an adjusting mechanism) and a polygon motor controller 54.

The line speed controller 51 sets the process line speed and sets rotation speeds and the like of rotary members including the photoconductive drums 2a to 2d in accordance with this process line speed. In this embodiment, the line speed controller 51 controls the rotation of the photoconductive drums 2a to 2d at the rotation speed m in the full-speed mode and controls the rotation of the photoconductive drums 2a to 2d at m/2 (half speed) or m/4 (¼ speed) in the low-speed mode.

The light emission controller 52 controls light emitting operations of the first and second LD modules 31, 41. The light emission controller 52 controls light emitting operations of laser diodes of the first and second LD modules 31, 41 according to image data given to form an image of each color. Here, if the first and second LD modules 31, 41 are LD modules of a single-beam type as shown in FIG. 5A, the light emission controller 52 causes the light emitting operations to be continuously performed when the line speed controller 51 sets the full-speed mode (first speed). On the other hand, the light emission controller 52 executes a control to intermittently emit laser light beams so that the laser light beams are incident on only some of a plurality of mirror surfaces of the polygon mirror 26 when the line speed controller 51 sets the low-speed mode (second speed). That is, the light emission controller 52 executes such a control that the laser diodes emit light and laser light beams modulated according to the image data are incident on some mirror surfaces, but the laser diodes are off for the other mirror surfaces.

If the first and second LD modules 31, 41 are LD modules of a multi-beam type as shown in FIG. 5B or 5C, the light emission controller 52 causes all of the plurality of laser diodes provided in the first and second LD modules 31, 41 to perform the light emitting operation, thereby generating a plurality of laser light beams, when the line speed controller 51 sets the full-speed mode. On the other hand, the light emission controller 52 causes only some of the plurality of laser diodes to perform the light emitting operation, thereby generating laser light beams with some laser light beams decimated, when the line speed controller 51 sets the low-speed mode.

The mirror posture controller 53 determines an adjustment amount of the third reflection mirror 36 (first reflecting mirror) necessary to make the first and second scanning lines SL1, SL2 drawn by the first and second laser light beams L1, L2 parallel, and causes the mirror driver 49 to perform an adjusting operation. When the line speed controller 51 sets the full-speed mode, the mirror posture controller 53 adjusts the posture of the third reflection mirror 36 using a predetermined first adjustment amount. Note that the posture of the third reflection mirror 36 in the full-speed mode may be set as a home position and the first adjustment amount may be a zero adjustment amount. When the line speed controller 51 sets the low-speed mode, the mirror posture controller 53 adjusts the posture of the third reflection mirror 36 using a predetermined second adjustment amount different from the first adjustment amount and capable of making the first and second scanning lines SL1, SL2 parallel.

The polygon motor controller 54 controls the drive of the polygon motor 262 to control the number of revolutions of the polygon mirror 26 about the axis. In this embodiment, the polygon motor controller 54 causes the polygon mirror 26 to rotate at a constant speed regardless of whether the full-speed mode or the low-speed mode is set.

Figure 9:
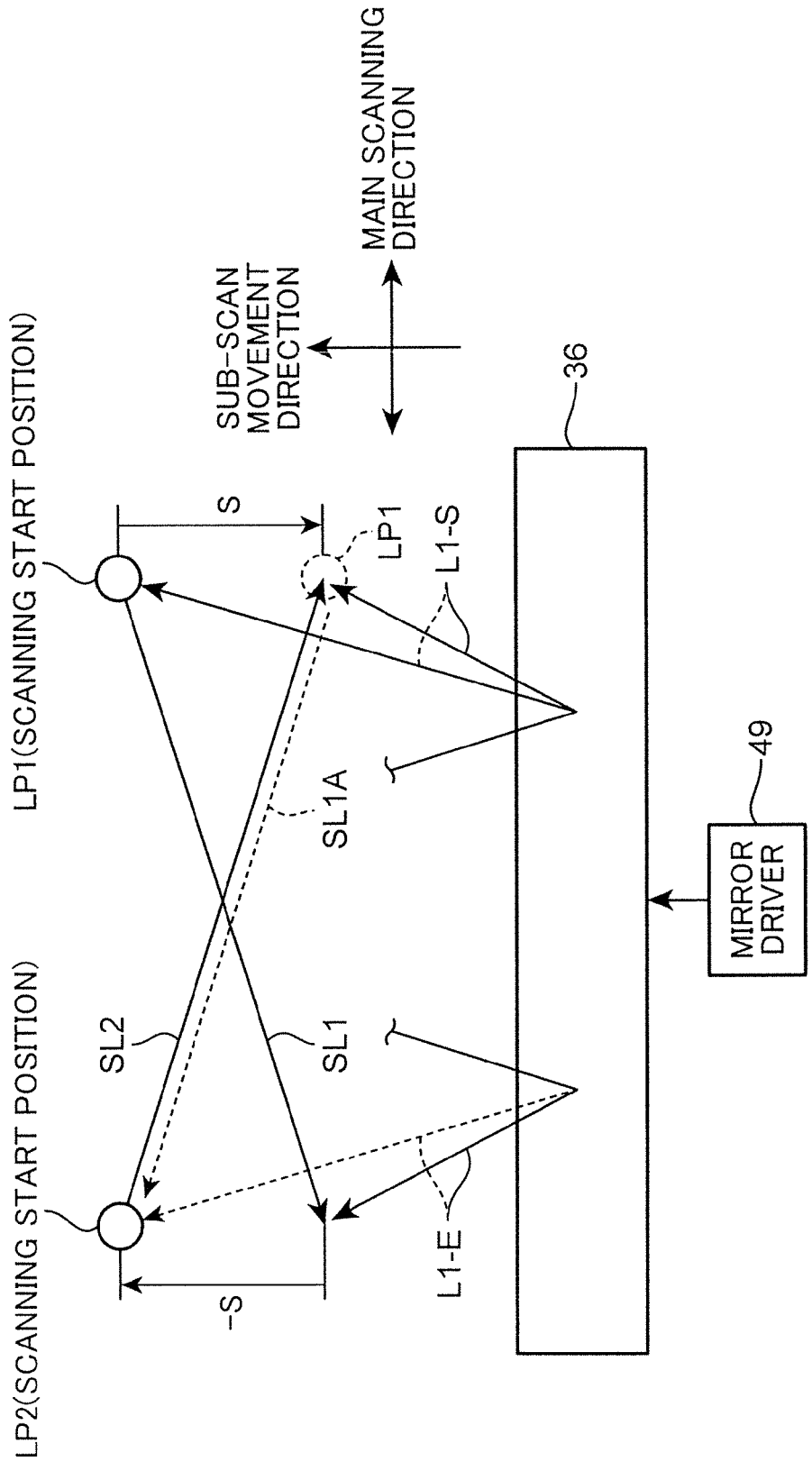
FIG. 9 is a diagram for explaining a scanning line gradient adjustment.

FIG. 9 is a diagram showing a gradient adjustment of the first and second scanning lines SL1, SL2 by the mirror posture controller 53 and the mirror driver 49. The mirror posture controller 53 calculates a distance S as the second adjustment amount by a calculation formula to be described next and adjusts the posture of the third reflection mirror 36 so that the imaging positions are shifted in the sub scanning direction by S at a scanning start point of the first laser light beam L1 for drawing the first scanning line SL1 and by −S at a scanning end point.

The distance S can be calculated as follows. If P denotes the number of the mirror surfaces of the polygon mirror 26, f (mm) denotes a composite focal length by the first and second imaging lenses 32, 33 (first scanning lens) and L (inch) denotes a print scan width (length of the scanning line SL1) on the circumferential surface of the photoconductive drum 2a by the beam spot LP1 of the first laser light beam L1, a viewing angle Va of scanning by one mirror surface of the polygon mirror 26 is calculated by the following Equation (11).

$$Va=(360\times2)/P=720/P \qquad (11)$$

A viewing angle Vb necessary to scan a distance L by a lens having the focal length f is calculated by the following Equation (12).

$$Vb=(L\times25.4/f)\times(180/\pi)=(25.4\times L\times180)/f\pi \qquad (12)$$

where a numerical value "25.4" is a millimeter conversion value of 1 inch.

An image region ratio, i.e. a ratio of the viewing angle Vb to the viewing angle Va is defined by the following Equation (13).

$$Vb/Va=\{(25.4\times L\times180)/f\pi\}/(720/P)=(25.4\times L\times P\times180)/(720\times\pi\times f)=25.4\times L\times P/4\pi \qquad (13)$$

If B denotes the number of the laser light beams generated by the first LD module 31 and d (dpi) denotes resolution, a sub scanning amount W of a movement during the deflection by one mirror surface of the polygon mirror 26 is defined by the following Equation (14).

$$W=B\times(25.4/d)\times103 \qquad (14)$$

Thus, a moving distance S0 in the sub scanning direction when the beam spot LP1 of the first laser light beam scans only the distance L, i.e. a generated sub scanning color shift amount is calculated by the following Equation (15) which is the product of Equations (13) and (14).

$$S0=W\times Vb/Va=\{(25.4\times B\times103)/d\}\times\{(25.4\times L\times P)/(4\pi f)\}=(25.42\times BLP\times103)/4\pi df \qquad (15)$$

The moving distance S0 calculated by the above Equation (15) is equivalent to a sub-scanning color shift amount generated in the full-speed mode. Thus, the mirror posture controller 53 adjusts the posture of the third reflection mirror 36 with the first adjustment amount set at the distance S0. Specifically, the mirror posture controller 53 adjusts the posture of the third reflection mirror 36 to skew the first scanning line SL1 so that the imaging position at the scanning start point (writing start position) of the beam spot LP1 of the first laser light beam L1 is shifted by the distance S0 toward an upstream side in the sub-scan movement direction and the imaging position at the scanning end point (writing end position) is shifted by the distance S0 toward a downstream side in the sub-scan movement direction. In this way, the line gap Sa (see FIG. 7A) in the full-speed mode can be eliminated. Note that if the home position of the third reflection mirror 36 is a posture adjusted by the distance S0 in advance, the mirror posture controller 53 executes a control to set the posture of the third reflection mirror 36 at the home position.

When the speed of the photoconductive drums 2a to 2d is 1/n of the full speed (n=2 or 4 in this embodiment) in the low-speed mode, a moving distance S (second adjustment amount) in the sub scanning direction when the beam spot LP1 of the first laser light beam L1 scans only the distance L is calculated by the following Equation (16).

$$S=1/n\times S0=(25.42\times BLP\times103)/4\pi ndf \qquad (16)$$

Here, if a sign is set with a sub-scan movement direction as a positive direction, the distance S is defined by the following Equation (1).

$$S=-(25.42\times BLP\times103)/4\pi ndf \qquad (1)$$

As shown in FIG. 9, the first and second scanning lines SL1, SL2 parallel in the full-speed mode causes a line gap when a change is made to the low-speed mode (see also FIG. 7C). To correct this line gap, the imaging position at the scanning start point of the beam spot LP1 of the first laser light beam L1 is shifted by the distance S toward the upstream side in the sub-scan movement direction. That is, the posture of the third reflection mirror 36 is adjusted so that a first laser light beam L1-S moving toward the scanning start point moves toward a point shifted by the distance S toward the upstream side. Further, the imaging position at the scanning end point of the beam spot LP1 is shifted by a distance −S toward the downstream side in the sub-scan movement direction. That is, the posture of the third reflection mirror 36 is adjusted so that a first laser light beam L1-E moving toward the scanning end point moves toward a point shifted by the distance S toward the downstream side. In this way, the first scanning line SL drawn by the first laser light beam L1 becomes a scanning line SL1A whose writing start side is skewed by the distance S and whose writing end side is skewed by the distance −S with respect to a line middle point. This scanning line SL1A becomes parallel to the second scanning line SL2 drawn by the second laser light beam L2. The mirror posture controller 53 adjusts the posture of the third reflection mirror 36 to skew the first scanning line SL1 in such a manner.

Figure 10A:
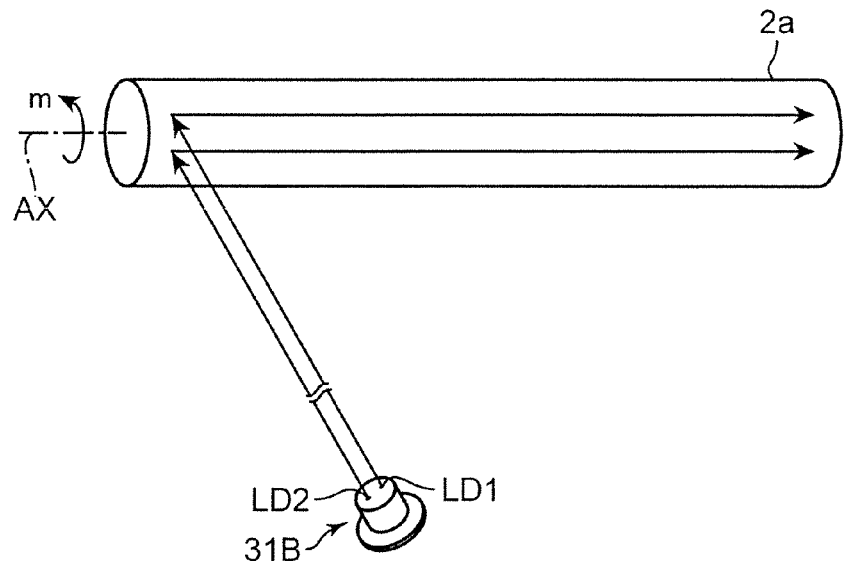
FIGS. 10A and 10B are diagrams showing an example of a line pitch adjustment of scanning lines.

Next, a line pitch adjustment control of the light emission controller 52 in the low-speed mode is described based on FIGS. 10A to 11B. FIG. 10A shows an example in which the multi-beam type LD module 31B (see FIG. 5B) including two laser diodes LD1, LD2 is used as a light source and the photoconductive drum 2a is rotated at the rotation speed m of the full-speed mode about the axis of rotation AX. In the full-speed mode, the light emission controller 52 causes the both laser diodes LD1, LD2 to emit light, thereby drawing two scanning lines by one scanning. A line pitch of these scanning lines conforms to a predetermined resolution.

Figure 10B:
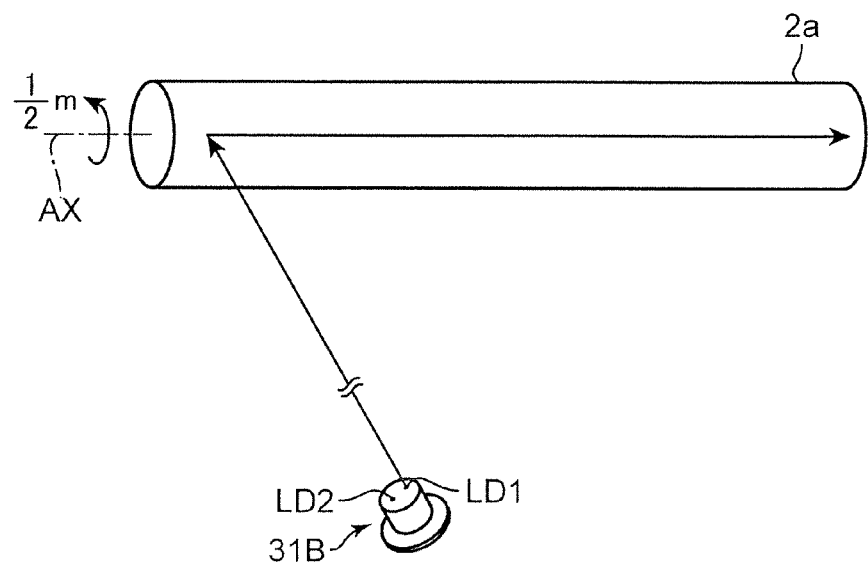

FIG. 10B shows an example in which the photoconductive drum 2a is rotated about the axis of rotation AX at half speed m/2 of the speed in the full-speed mode. In the half-speed mode (low-speed mode), the light emission controller 52 causes only the laser diode LD1 to emit light and deactivates the laser diode LD2. Accordingly, one scanning line is drawn on the circumferential surface of the photoconductive drum 2a by one scanning. As described above, the polygon motor controller 54 rotates the polygon mirror 26 at the constant speed regardless of whether the full-speed mode or the low-speed mode is set. Thus, the line pitch of the scanning lines can be matched with the predetermined resolution by simply turning one laser diode LD2 off in response to a reduction of the drum rotation speed to the half speed m/2. Specifically, the line pitch can be optimized without requiring a particularly complicated control such as a rotation control of the polygon mirror or a light quantity control of the laser diodes.

Note that in the case of using the multi-beam type LD module 31C (see FIG. 5C) including four laser diodes LD1 to LD4, the light emission controller 52 causes only every other ones of the four laser diodes (e.g. LD1 and L3, or LD2 and LD4) to emit light and deactivates the other two in the half-speed mode. Further, in the case of the ¼speed mode, the light emission controller 52 causes only one of the four laser diodes to emit light.

Figure 11A:
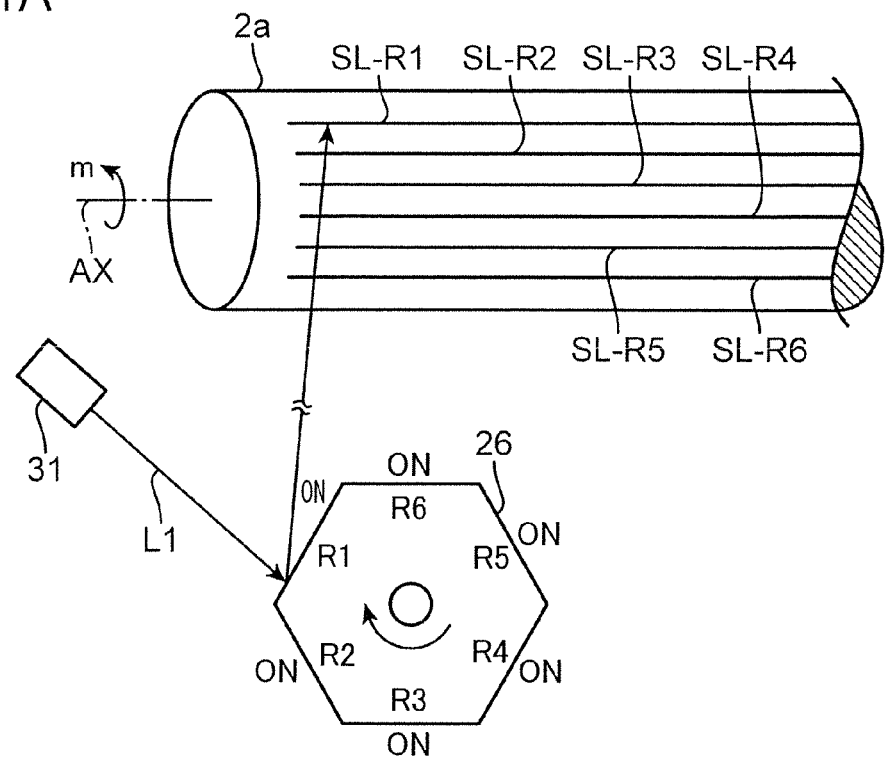
FIGS. 11A and 11B are diagrams showing an example of the line pitch adjustment of scanning lines.

FIG. 11A shows an example in which the single-beam type LD module 31A (see FIG. 5A) is used as a light source and the photoconductive drum 2a is rotated about the axis of rotation AX at the rotation speed m of the full-speed mode. In the full-speed mode, the light emission controller 52 causes the LD module 31A to continuously emit light, thereby causing the first laser light beam L1 to be incident on all the mirror surfaces R1 to R6 of the polygon mirror 26. In this way, six scanning lines SL-R1 to SL-R6 are drawn on the circumferential surface of the photoconductive drum 2a by the first laser light beam L1 deflected by the respective mirror surfaces R1 to R6 per rotation of the polygon mirror 26. A line pitch of the respective scanning lines SL-R1 to SL-R6 conforms to a predetermined resolution.

Figure 11B:
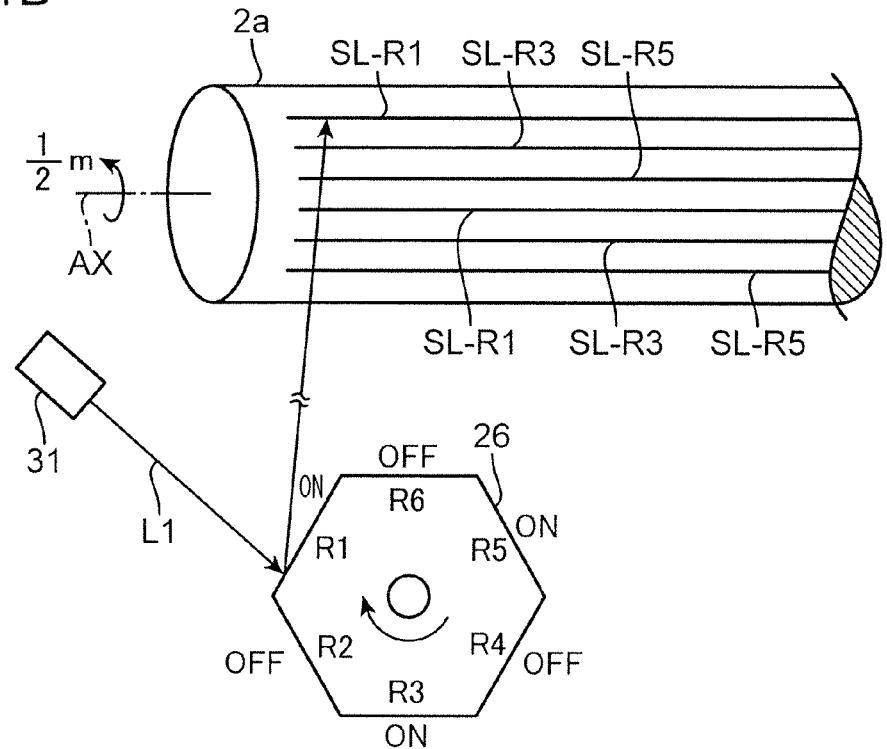

FIG. 11B shows an example in which the photoconductive drum 2a is rotated about the axis of rotation AX at the half speed m/2 of the full-speed mode. In the half-speed mode, the light emission controller 52 controls the LD module 31A to intermittently generate the first laser light beam L1 so that the first laser light beam L1 is incident on every other ones of the mirror surfaces R1 to R6. Here is shown an example in which the LD module 31A is set on only during periods in which the mirror surfaces R1, R3 and R5 face the LD module 31A while being set off during periods in which the mirror surfaces R2, R4 and R6 face the LD module 31A.

In this way, three scanning lines SL-R1, SL-R3 and SL-R5 are drawn on the circumferential surface of the photoconductive drum 2a per rotation of the polygon mirror 26 by the first laser light beam L1 deflected by the mirror surfaces R1, R3 and R5. Since the rotation speed of the polygon mirror 26 is constant, the line pitch of the scanning lines SL-R1, SL-R3 and SL-R5 matches a predetermined resolution. Specifically, the line pitch can be optimized without requiring a particularly complicated control such as a rotation control of the polygon mirror or a light quantity control of the laser diodes.

Note that, in the case of the ¼speed mode, the light emission controller 52 controls the LD module 31A so that the first laser light beam L1 is incident only on every fourth mirror surface out of the mirror surfaces R1 to R6. That is, the first laser light beam L1 is incident in the order of the mirror surfaces R1→R5→R3→R1. Further, in the case of reducing the drum rotation speed to the ¼speed or lower in the case of using a multi-beam type LD module, the intermittent control shown in FIG. 11B and the control of FIG. 10B may be used in combination.

According to the optical scanning device 13 of this embodiment described above, when the rotation mode of the photoconductive drums 2a, 2b is changed from the full-speed mode to the low-speed mode (half speed, ¼speed), the mirror posture controller 53 adjusts the posture of the third reflection mirror 36 to maintain the parallelism of the scanning lines SL1, SL2 also in the low-speed mode. Accordingly, even if the rotation speed of the photoconductive drums 2a, 2b changes in the optical scanning device 13 of the opposite scanning method, the occurrence of a color shift in the sub scanning direction itself can be prevented.

Although the embodiment of the present disclosure has been described above, the present disclosure is not limited to this. For example, the following modifications can be adopted.

(1) In the above embodiment, the example in which the mirror posture controller 53 and the mirror driver 49 adjust the posture of the third reflection mirror 36 of the first scanning optical system 30 is described. Instead of this, a mode in which the posture of the third reflection mirror 46 of the second scanning optical system 40 is adjusted (mode in which the second scanning line is skewed) may be adopted. Alternatively, a mode in which the postures of the both third reflection mirrors 36, 46 are adjusted may be adopted. Further, the mirror(s) other than the third reflection mirrors 36, 46 may be adjusted.

(2) In the above embodiment, the example in which the half speed and the ¼speed of the full speed are prepared as the low-speed modes is described. The low-speed mode has only to be 1/n (n is an integer not smaller than 2) of the full speed and may be ⅓speed and ⅕speed. Alternatively, a mode in which the drum rotation speed is arbitrary and a skew amount corresponding to each rotation speed is stored in a memory in advance may be adopted. However, if the half speed and the ¼speed of the full speed are set as the low-speed modes, the line pitch can be easily optimized simply by only on-off controlling the LD module without performing a rotation control of the polygon mirror or a light quantity control of the laser diodes as described above based on FIGS. 10A, 10B, 11A and 11B, which is particularly preferable.

(3) In the above embodiment, the two-color sharing type is illustrated in which the scanning optical systems 30, 40 of two colors are housed in one optical scanning device 13. As long as the opposite scanning method is adopted, a four-color sharing type may also be adopted in which scanning optical systems of four colors are housed in one optical scanning device.

As described above, according to the present disclosure, the parallelism of the first and second scanning lines can be maintained even if the rotation speed of the photoconductive drums changes in the optical scanning device of the opposite scanning method. Thus, it is possible to provide an optical scanning device and an image forming apparatus free from the occurrence of a color shift in a sub scanning direction.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. An optical scanning device for scanning a first circumferential surface as a surface to be scanned of a first photoconductive drum rotatable about an axis and a second circumferential surface as a surface to be scanned of a second photoconductive drum rotatable about an axis with light beams, comprising:
- a first light source for emitting a light beam;
- a second light source for emitting a light beam;
- a polygon mirror including a plurality of mirror surfaces and configured to scan the first circumferential surface in a first direction along a main scanning direction by deflecting a first light beam emitted from the first light source and, on the other hand, scan the second circumferential surface in a second direction opposite to the first direction by deflecting a second light beam emitted from the second light source while rotating about an axis;
- a first scanning lens for imaging the first light beam on the first circumferential surface and a second scanning lens for imaging the second light beam on the second circumferential surface;
- a first reflecting mirror for reflecting the first light beam so that the first light beam propagates toward the first circumferential surface, the first reflecting mirror being arranged on optical path between the polygon mirror and the first circumferential surface, and a second reflecting mirror for reflecting the second light beam so that the second light beam propagates toward the second circumferential surface, the second reflecting mirror being arranged on optical path between the polygon mirror and the second circumferential surface; and
- an adjusting mechanism for adjusting the posture of at least the first reflecting mirror, wherein the adjusting mechanism:
  - adjusts the posture of the first reflecting mirror using a predetermined first adjustment amount so that a first scanning line drawn by the first light beam to scan the first circumferential surface and a second scanning line drawn by the second light beam to scan the second circumferential surface are parallel when a rotation speed of the first and second photoconductive drums is a first speed m that is a full speed of the first and second photoconductive drums, and
  - adjusts the posture of the first reflecting mirror using a predetermined second adjustment amount different from the first adjustment amount and capable of making the first and second scanning lines parallel at a second speed that is m×1/n (where n is an integer not smaller than 2) when the rotation speed of the first and second photoconductive drums is the second speed, and wherein the adjusting mechanism calculates a distance S as the second adjustment amount by Equation (1) and adjusts the posture of the first reflecting mirror to skew the first scanning line so that an imaging position is shifted by S at a scanning start point and by -S at a scan ending position of the first light beam on the first circumferential surface in a sub scanning direction:

$$S = -(25.4^2 \times B \cdot L \cdot P \times 10^3)/4\pi n d f \quad (1)$$

where a sign is set with a sub-scan movement direction as a positive direction, and a numerical value "25.4" is a millimeter conversion value of 1 inch, and B: number of light beams of the first light source,
L: print scan width (inch),
P: number of the mirror surfaces of the polygon mirror,
d: resolution (dpi), and
f: focal length (mm) of the first scanning lens.

2. An optical scanning device according to claim 1, wherein:
- the first and second light sources are multi-beam type light sources for emitting a plurality of light beams;
- the optical scanning device further comprises a light source controller for controlling light emitting operations of the first and second light sources; and
- the light source controller causes only some of the plurality of light beams to be generated when the rotation speed of the first and second photoconductive drums is set at the second speed.

3. An optical scanning device according to claim 1, wherein:
- the first and second light sources are single-beam type light sources for emitting one light beam;
- the optical scanning device further comprises a light source controller for controlling light emitting operations of the first and second light sources; and
- the light source controller causes the light beams to be intermittently generated so that the light beams are incident on some of a plurality of mirror surfaces of the polygon mirror when the rotation speed of the first and second photoconductive drums is set at the second speed.

4. An image forming apparatus, comprising:
- a first photoconductive drum having a first circumferential surface as a surface to be scanned and rotatable about an axis;
- a second photoconductive drum having a second circumferential surface as a surface to be scanned and rotatable about an axis; and
- an optical scanning device according to claim 1 for radiating light beams to the first and second circumferential surfaces.

* * * * *